United States Patent [19]

Nishida

[11] Patent Number: 5,215,159
[45] Date of Patent: Jun. 1, 1993

[54] SYSTEM FOR CONTROLLING A DRIVING DEVICE OF A VEHICLE

[75] Inventor: Minoru Nishida, Hyogo, Japan
[73] Assignee: Mitsubishi Denki K.K., Tokyo, Japan
[21] Appl. No.: 708,426
[22] Filed: May 31, 1991

[30] Foreign Application Priority Data

Jun. 4, 1990 [JP] Japan .................. 2-146994

[51] Int. Cl.$^5$ ............................. B60K 31/04
[52] U.S. Cl. ............................. 180/179; 180/169; 180/171
[58] Field of Search ............. 180/167, 170, 171, 179, 180/169; 364/426.01, 426.04; 123/352

[56] References Cited

U.S. PATENT DOCUMENTS 4,706,195  11/1987  Yoshino et al. ............. 180/169
4,947,952  8/1990  Kajiwara ................. 364/426.01

FOREIGN PATENT DOCUMENTS 2642211  6/1978  Fed. Rep. of Germany ...... 180/171
3304620  9/1983  Fed. Rep. of Germany .
3247450  6/1984  Fed. Rep. of Germany ...... 180/169
3936925  5/1990  Fed. Rep. of Germany .
59-231157  12/1984  Japan ................... 180/179
2-128930  5/1990  Japan ................... 180/170

*Primary Examiner*—Eric D. Culbreth
*Attorney, Agent, or Firm*—Sughrue, Mion, Zinn, Macpeak & Seas

[57] ABSTRACT

A system for controlling running of a vehicle comprises a switch for setting a slow-run mode, a sensor for detecting that the brake is being applied, a driving force control device mechanically separated from the accelerator for controlling a driving force of the vehicle, a sensor for detecting the running speed of the vehicle, a switch for setting a slow-run speed command signal. A target speed is generated on the basis of information concerning the brake activation and, the running speed of the vehicle and the slow-run speed command signal value. In the slow-run mode, when the brake is not applied, the driving force control device is driven to cause the vehicle to run at the target slow-run speed, and when the brake is applied, the driving force control device is driven so that no driving force is produced at least in the direction of travel of the vehicle.

3 Claims, 8 Drawing Sheets

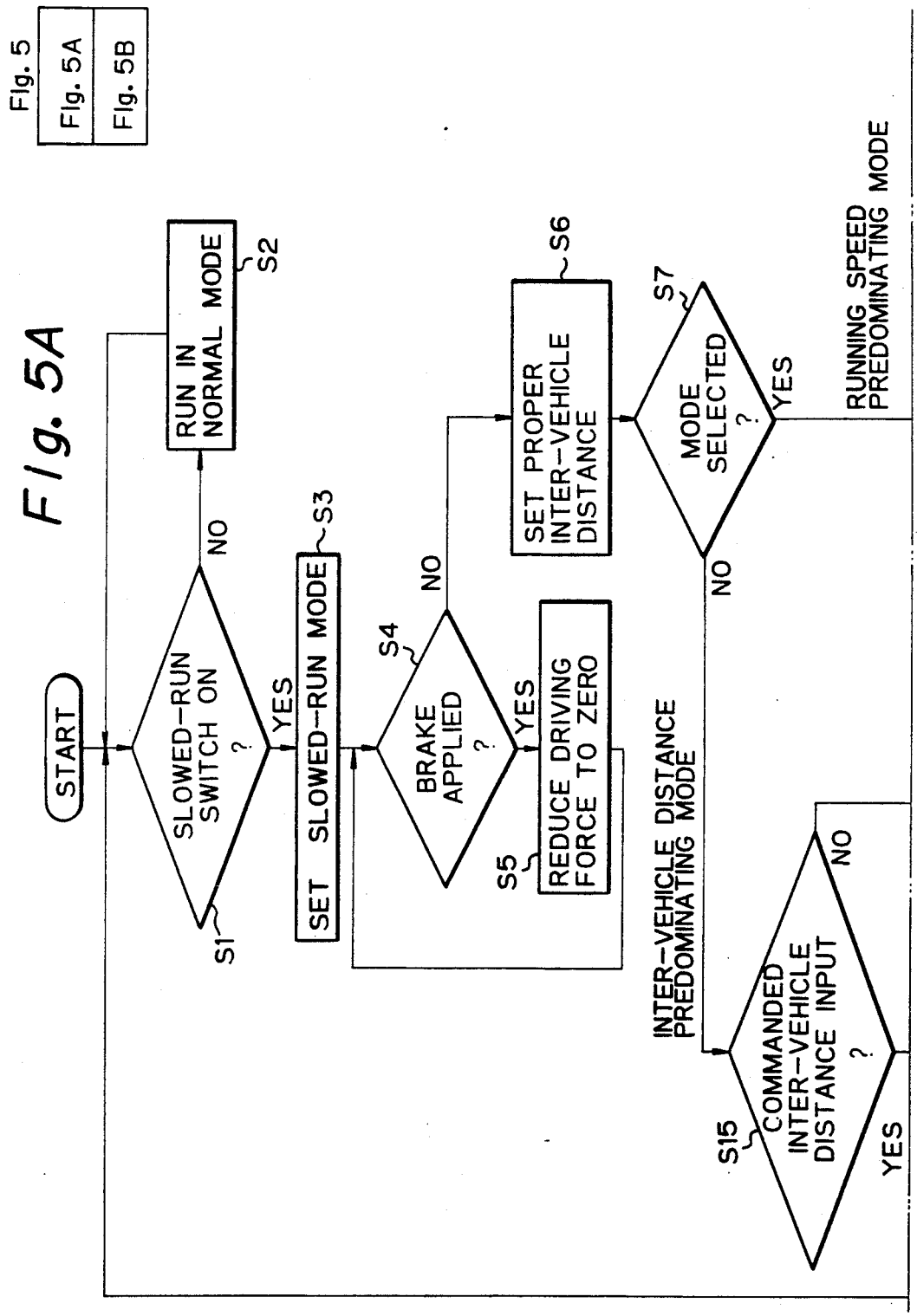

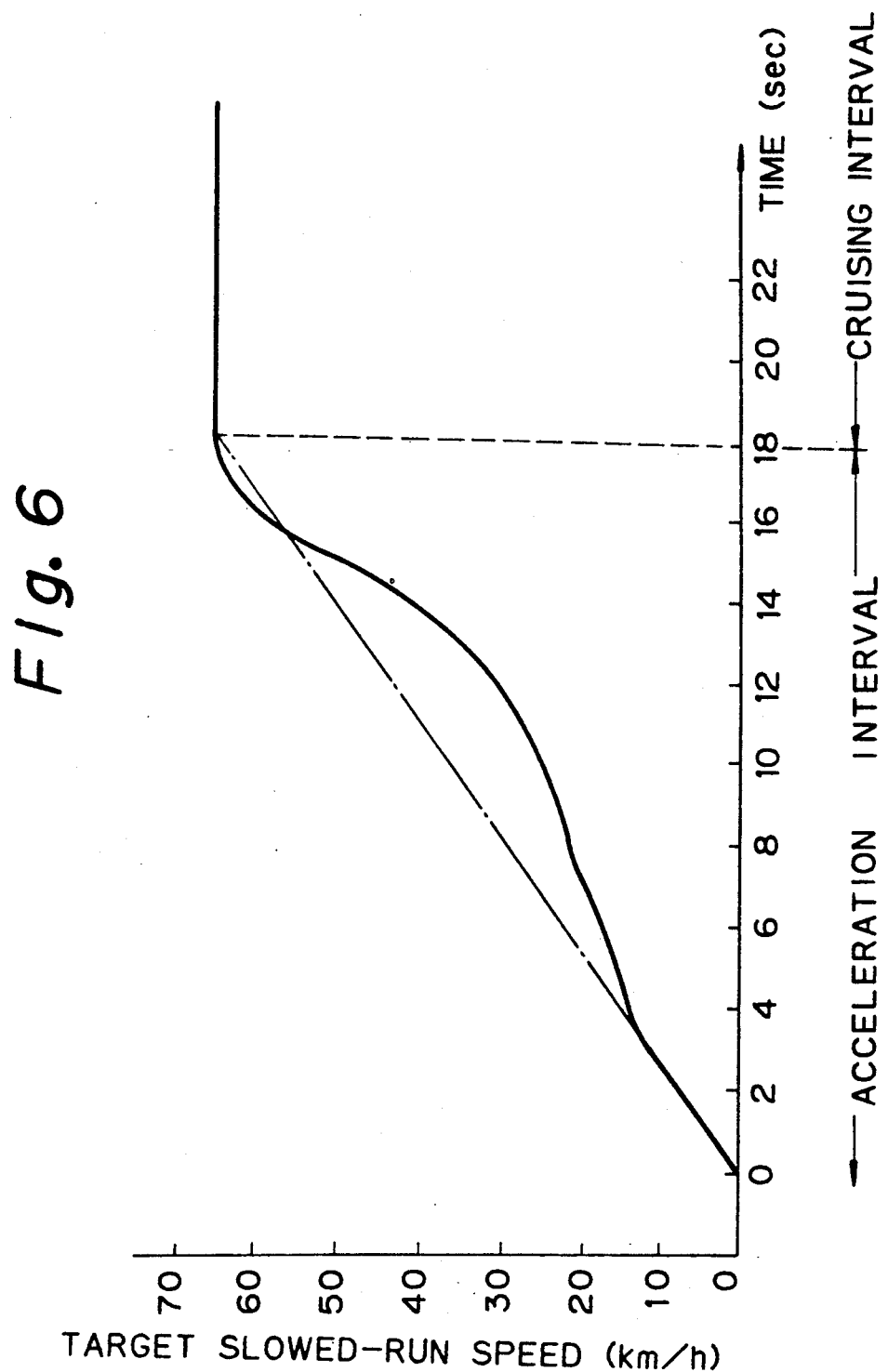

SYSTEM FOR CONTROLLING A DRIVING DEVICE OF A VEHICLE

BACKGROUND OF THE INVENTION

1. Field of the Invention

This invention relates to a system for controlling a driving apparatus of a vehicle which includes an engine, a transmission for receiving the engine output to drive the vehicle for controlling the running thereof, and, more particularly, to a system for controlling the running of a vehicle suitable when the vehicle negotiates a congested road at low speed and is repeatedly starting and stopping and when the vehicle cruises on a relatively busy highway, and on an ordinary suburban road.

2. Prior Art

Hitherto, a speed of a motor vehicle has been controlled by opening or closing the throttle valve by pulling a wire, such as a piano wire, by means of an accelerator pedal for adjusting an engine output. Recently, as disclosed in "Isuzu Technical Report" No. 72, pages 7-20, a system has been proposed which includes an accelerator pedal disconnected from a throttle valve opened and closed by a sensor for sensing the depression of the accelerator pedal, and an electric motor for driving the throttle valve and a controller. This system is arranged so that, as shown in FIG. 1, the output of an accelerator pedal 50 is detected by a computer unit 52, the detected signal being processed to reflect the driver's intention. On the basis of information derived from a selector position sensor 54, a cooling water temperature sensor 56, an engine rotation sensor 58 for detecting the rotation of the engine EN, a gear position sensor 60, a vehicle speed sensor 62, and a clutch position sensor 64, a motor MT for regulating the opening of a throttle valve SV is operated, a clutch CL is connected and disconnected and a gear position of a transmission TM is controlled, whereby easy drive and low fuel consumption can be established.

A conventional vehicle control system being constructed such as described above, when a road is crowded causing consecutive motor vehicles to repeatedly start and stop, the accelerator pedal and the brake have to be depressed alternately. Under these conditions, a driver must constantly control an accelerator pedal being careful not to depress it excessively. As such, a driver will become fatigued over a period of time, thus increasing the probability of an accident.

SUMMARY OF THE INVENTION

The present invention is intended, to solve the above-mentioned problems and provide a system for controlling a driving apparatus of a motor vehicle capable of preventing driver fatigue when a vehicle runs at low speed (a running condition not containing substantial acceleration and deceleration such as a rapid acceleration on sudden stopping is hereinafter referred to as "slow-run"), thereby providing safe running of a vehicle.

According to one aspect of the invention, a system for controlling a driving apparatus of the vehicle comprises means for setting a slow-run mode, means for detecting that the brake is being applied, means mechanically separated from the accelerator for controlling a driving force of the vehicle, means for detecting a running speed of the vehicle, means for setting a slow-run speed command signal, means receiving information concerning the brake activation, the running speed of the vehicle and the slow-run speed command signal for generating a target slow-run speed. In the slow-run mode, when the brake is not applied, the means for controlling the driving force is driven so as to allow the running speed of the vehicle to become the target slow-run speed, and, when the brake is applied, no driving force is produced at least in the direction of travel of the vehicle.

Thus, when the slow-run mode is set, the start, stop and running operation of the vehicle without abrupt acceleration and deceleration can be attained by operating one pedal, that is, the brake. Thus, the driver fatigue is minimized even when the vehicle is travelling on a heavily congested road where the driver repeatedly starts and stops the vehicle, and the time required for operating the brake to avoid an obstacle, a person or a vehicle suddenly appearing in front of the vehicle can be minimized whereby highly safe driving is possible.

The control system may further comprise means for measuring a distance between the driver's vehicle and the vehicle in front, and means for generating a target slow-run speed generated in response to information concerning the brake operation, the inter-vehicle distance and the running speed of the vehicle, and a slow-run speed command signal. This control system will result in decreasing the number of braking operations and thus increasing driving safety.

The control system may further comprise means for selecting either one of two different control modes, i.e., an inter-vehicle distance predominating control mode or a running speed predominating control mode, and the means for generating the target slow-run speed can generate a target slow-run speed in accordance with the selected control mode. Thus, the driver can either maintain an inter-vehicle distance (a distance between the driver's vehicle and the vehicle in front) at a proper value or drive the vehicle at a desired running speed in accordance with the driver's preference, thereby running the vehicle without adjusting an amount of accelerator depression.

According to another aspect of the invention, a system for controlling a driving apparatus of a vehicle comprises means for setting a slow-run mode, means for detecting that the brake is being applied, means mechanically separated from the accelerator for controlling a driving force of the vehicle, means for sensing a running speed of the vehicle, means for measuring a distance between the driver's vehicle and the vehicle in front, means for setting a slow-run speed command signal, means, in response to information concerning the brake activation, the inter-vehicle distance and the running speed of the vehicle and the slow-run speed command signal, for generating a target slow-run speed, and decision means, in response to information concerning the inter-vehicle distance and the running speed of the vehicle, for calculating a speed approaching the vehicle in front to make a decision as to whether the measured inter-vehicle distance is within a proper distance value so as to output a warning signal to the driver and a braking command signal to the driving force control device. In the slow-run mode, if the braking commanding signal is output from the proper inter-vehicle distance decision means, the driving force control means is driven in accordance with the braking command signal. If there is no such braking command signal, when the brake is not applied, the driving force control means is driven to cause the vehicle to run at the target slow-run speed, and when the brake is applied, the driving force control means is driven such that no driving force is produced at least in the direction of travel of the vehicle.

Thus, safe driving can be achieved in the slow-run mode in various running conditions including low speed running on a congested road and cruising on a suburban road or highway.

The proper inter-vehicle distance decision means may output a warning signal when the product of a speed approaching the vehicle in front and a first set value is greater than a current inter-vehicle distance, and output a braking command signal when the product of a speed approaching the vehicle in front and a second set value is larger than a current inter-vehicle distance. This operation can minimize a risk of collision between vehicles.

In an embodiment of the control system of the invention, once a vehicle is set in the slow-run mode by a driver, the driving force generating device and the transmission of the vehicle are controlled to cause the vehicle to run at a target slow-run speed generated on the basis of information of a slow-run speed command signal set by the driver and a running speed of the vehicle, without depressing the accelerator further and adjusting an amount of accelerator depression, thereby enabling the vehicle to be driven with the brake only. The running speed is supervised by the computer unit with a signal from the vehicle speed sensor. The computer unit operates to variably control the opening of the engine throttle or a current supplied to the electric motor and adjust a speed regulating mechanism and a load located in the driving force transmitting path, thereby maintaining a vehicle speed substantially corresponding to a sequentially generated target slow-run speed.

If a target slow-run speed is generated on the basis of information concerning an inter-vehicle distance in addition to the information described above, the brake pedal is less frequently depressed and safety is enhanced.

The target slow-run speed can be generated in accordance with either of two different modes, i.e., vehicle speed predominating control mode or inter-vehicle distance predominating control mode, which is selected by the driver.

Thus, according to an embodiment of the invention, when the brake pedal is depressed, the computer unit detects this fact immediately to cease the generation of the driving force, or cause the driving force control means to operate to vary the transmission such that a braking force is further generated. When the driver stops applying the brake, the vehicle accelerates again to run at a target slow-run speed. As a result, it is unnecessary for the driver to shift his foot from the brake pedal to the accelerator pedal.

In a control system according to another embodiment of the invention, the computer unit calculates speed approaching the vehicle in front on the basis of information concerning a running speed of the vehicle and a distance between the vehicle and the vehicle in front. If such a distance becomes less than a proper value, then a warning signal is issued to draw the driver's attention and a braking force is produced through the driving force control means to ensure safer driving.

BRIEF DESCRIPTION OF THE DRAWINGS

FIGS. 5A and 5B depict a flowchart showing an operation of the vehicle run controlling system according to the embodiment of the present invention;

FIG. 6 is a graph showing an example of changes in the target slow-run speed with respect to time according to the embodiment of the invention;

DESCRIPTION OF THE PREFERRED EMBODIMENTS

Figure 1:
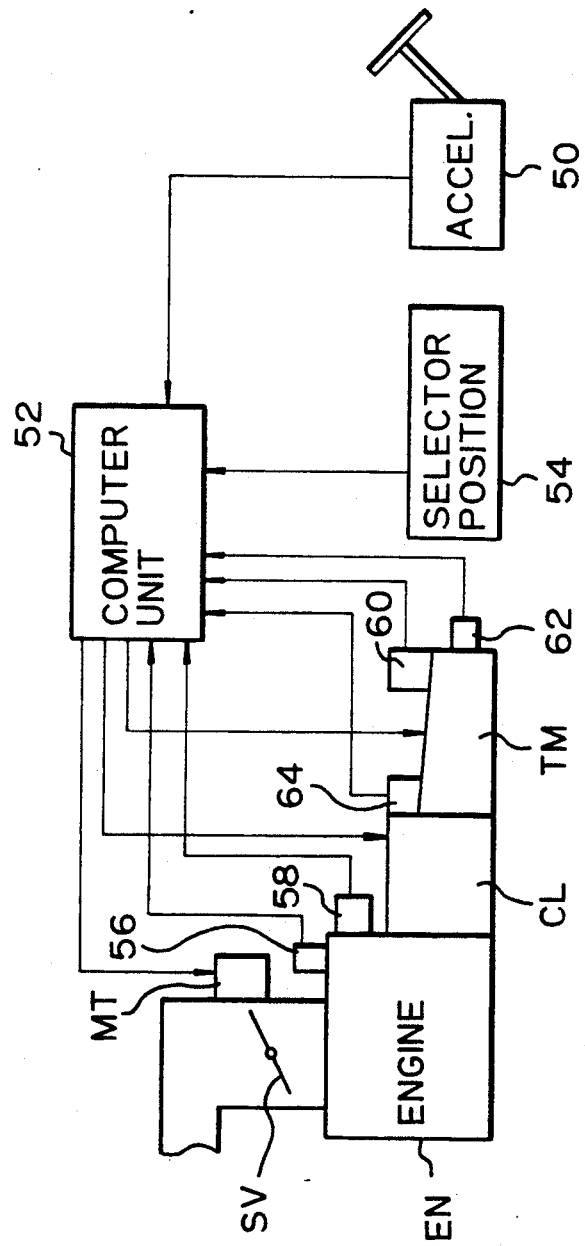
FIG. 1 is a block diagram of a prior art system for controlling the running of a vehicle.
Figure 2:
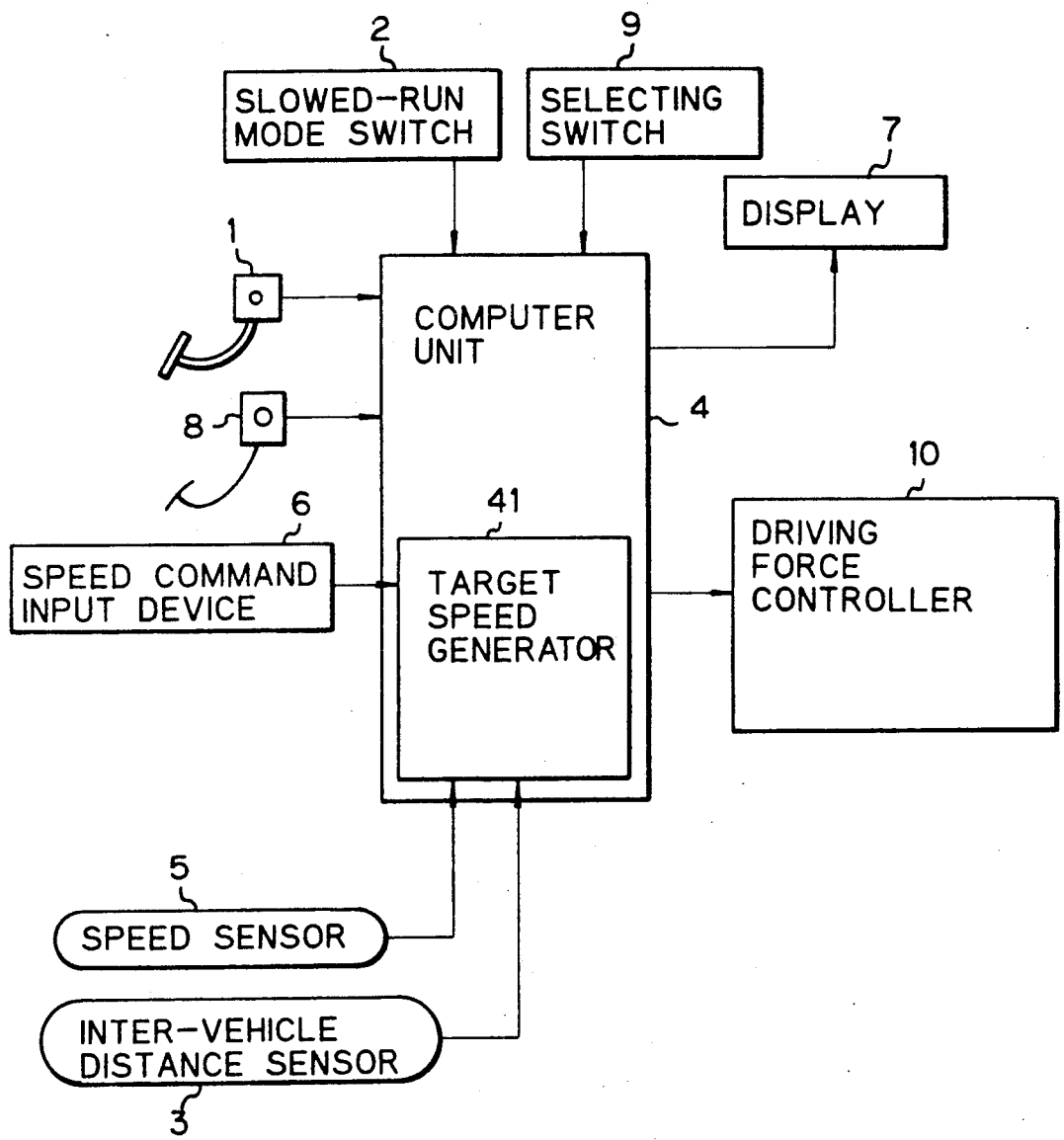
FIG. 2 is a block diagram of a system for controlling the running of a vehicle in accordance with an embodiment of the present invention.
Figure 3:
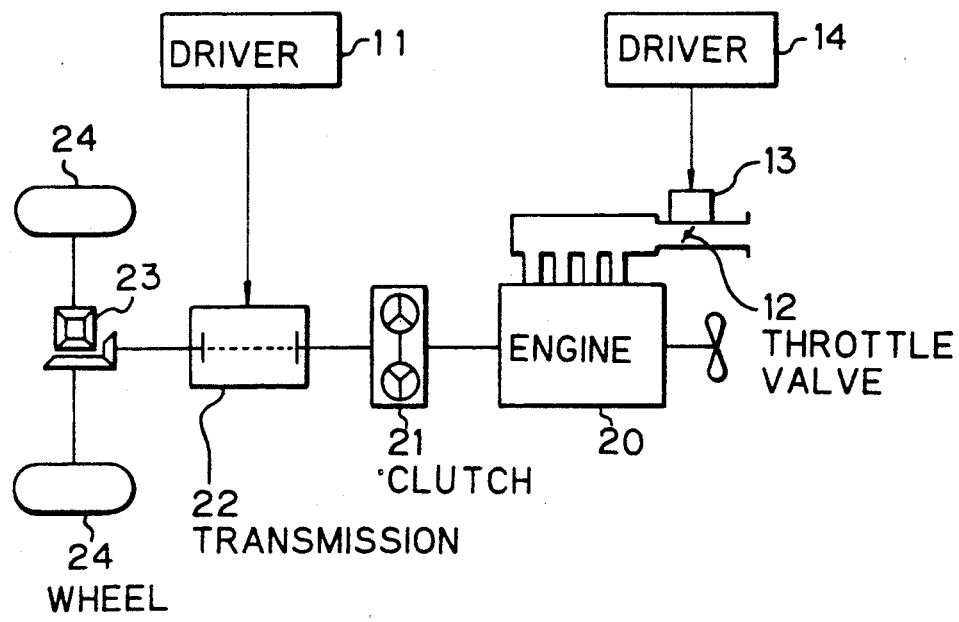
FIG. 3 is a block diagram of a driving force control device of the embodiment of the invention.

A first embodiment of the invention will now be described with reference to the drawings. In FIG. 2, a brake switch 1 for detecting the depression of a brake by the driver or a brake pedal sensor 1 for generating an electric signal corresponding to a brake depression amount, a switch 2 located to be easily operated by the driver for setting the vehicle in a slow-run mode, and an inter-vehicle distance sensor 3 which employs a radar system or a triangulation system using picture images are connected to a computer unit 4 comprising a well-known microcomputer including a ROM, a RAM, a CPU, etc., A/D converter circuits and input and output interface circuits having pulse waveform shaping circuits and executing a main operation in accordance with a software program. In addition to the above-described brake activation detecting signal, a slow-run mode setting signal and an inter-vehicle distance signal, an electric signal indicative of a vehicle speed is input from a vehicle speed sensor 5 to the computer unit 4, and an electric signal corresponding to a speed command in the slow-run mode is also input from a speed command inputting device 6 to the computer unit 4. A circuit for generating a target slow-run speed is provided within the computer unit 4 and includes a microcomputer, a ROM, etc. The computer unit 4 is further connected with a display device 7 which informs the driver that the slow-run mode has been set in response to a signal output by the computer unit 4 as well as informing the driver of a commanded slow-run speed, an accelerator pedal sensor 8 for detecting an amount of accelerator depression by the driver, a selector switch 9 for selecting a control mode in the slow-run mode as an input, and a driving force control device 10 for generating a driving force of the vehicle in response to a command signal from the computer unit 4. (It is noted that the driving force control device is mechanically separated from the accelerator). FIG. 3 schematically illustrates an example of the driving force control device 10. As seen in FIG. 3, an engine 20 for generating a driving force is coupled to a clutch section 21 which is attached to the output shaft of the engine to transmit and control an engine torque. The clutch section 21 may be a disk clutch or a hydraulic torque converter. A transmission 22 receives a rotational driving force from the clutch section 21 and appropriately converts the number of rotation and an amount of torque to transmit the driving force to the final driving section 23 which comprises a reduction gear set and a differential gear train. Wheels 24 actually drive the vehicle using the rotational force of the final driving section 23. The transmission 22 is adapted to change a combination of gear sets having different gear ratios through a hydraulic or electric actuator. An actuator driving circuit 11 drives a gear change actuator in the transmission 22 in response to a command signal from the computer unit 4. The output of the engine 20 is varied by the degree of opening of a throttle valve 12, and the opening of the throttle valve 12 is electrically controlled by a throttle actuator 13 including an electric motor. In order to open and close the throttle valve 12 in response to the command signal from the computer unit 4, a driving circuit 14 generates a signal for driving the throttle actuator 13.

An operation of the vehicle run control system will now be described.

When the slow-run mode setting switch 2 is in its off-position and the vehicle is in the normal driving mode, the computer unit 4 feeds a command through the driving circuit 14 to the throttle actuator 13 so as to open the throttle valve 12 basically in proportion to an amount of accelerator depression. When the vehicle is caught in a traffic jam and forced to repeatedly start and stop and the mode switch 2 is turned on by the driver, the computer unit 4 detects the signal from the mode switch 2. For safety, however, it is desirable that running control in the slow-run mode does not immediately commence, but is permitted to be set when certain predetermined conditions are satisfied. It is preferable for such predetermined conditions to be as simple as possible and necessary to at least maintain the safety desired. For example, the vehicle can actually enter in the slow-run mode when the brake pedal is operated or when the distance between the driver's vehicle and the vehicle in front is larger than that preset with respect to the running speed of the driver's vehicle. Such an operation is performed by the computer unit 4 which receives a brake operation detection signal and a signal output from the inter-vehicle distance sensor and processes these signals using a stored program. When the slow-run mode is set, the computer unit 4 informs the driver through the display device 7 visibly or audibly that the slow-run mode has been set so that the driver can always recognize this fact during the period of time when the slow-run mode is being set. When the slow-run mode is entered, the computer unit 4 sequentially generates a target slow-run speed in accordance to data input from the speed command inputting device 6, information as to whether the brake is applied and data input from the inter-vehicle distance sensor 3 and the vehicle speed sensor 5, so that the vehicle speed is set to the target slow-run speed.

At this time, a selected one of two different target slow-run speeds is generated. More specifically, the switch 9 selects either of two control modes, that is, the mode in which the running speed of the driver's vehicle predominantly becomes a commanded slow-run speed input from the input device 6 (running speed predominating control mode) or the mode in which the distance between the driver's vehicle and the vehicle running in front becomes a predetermined value (inter-vehicle distance predominating control mode). The speed in the selected control mode is output and set as a target slow-run speed used in an actual operation, as described below. Even when the inter-vehicle distance predominating control mode is selected, when a signal output from the inter-vehicle sensor 3 shows no vehicle in front, the running speed predominating control mode is entered immediately or after a lapse of a predetermined time, so that the running condition does not change abruptly. The reverse shift from the running speed predominating control mode to the inter-vehicle distance predominating control mode when there is the vehicle in front is similarly performed. In the low-speed running mode, operating only the brake can achieve accelerating and constant speed running operations by controlling the throttle valve 12 of the engine 20 and the transmission 22 in response to a drive command signal output through the throttle actuator driving circuit 14 and the gear ratio change actuator driving circuit 11 in accordance with a control process programmed in the computer unit 4 in such a way that the vehicle runs at the target slow-run speed without the accelerator being operated.

As described above, in the running speed predominating control mode the vehicle runs to maintain a commanded speed in a so-called cruising condition in which the vehicle runs without acceleration or deceleration. In the inter-vehicle distance predominating control mode the vehicle runs to always maintain a commanded distance between the vehicle in front or a proper distance automatically set by the computer on the basis of a current vehicle speed. Thus, during a transient running condition reaching the cruising, even in the running speed predominating control mode, a target slow-run speed is sequentially set in consideration of the distance to the vehicle in front. In the inter-vehicle distance predominating control mode, as long as the driver does not operate the brake, a target slow-run speed is sequentially set in consideration of the distance to the vehicle in front, even when the vehicle is accelerated or cruising. Either of these two control modes can be selected in accordance with a driver's preference and current traffic conditions, which makes the present system effective in various situations.

Figure 4:
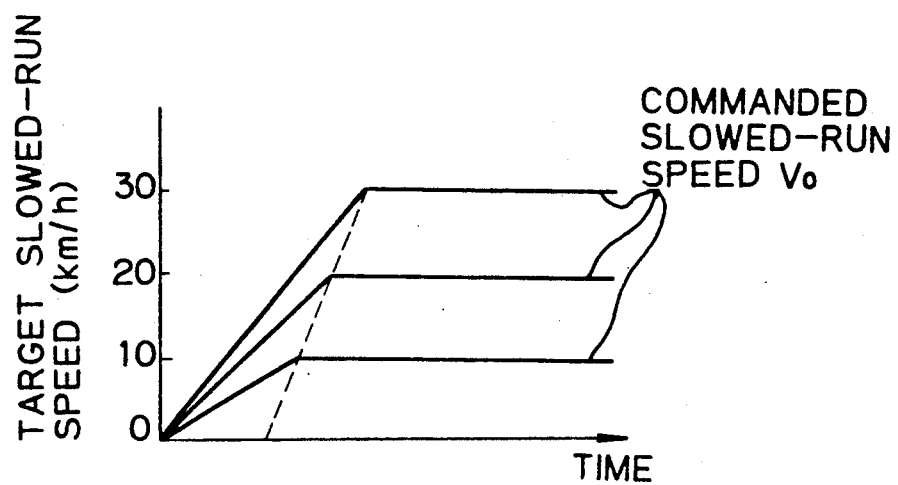
FIG. 4 is a graph showing examples of a target slow-run speed according to the embodiment of the invention.

FIG. 4 shows an example of acceleration patterns when a vehicle runs slowly in the running speed predominating control mode. As shown in this figure, a target slow-run speed value is time-sequentially set to allow the driving force control device to be operated in response thereto. During running in the slow-run mode, when the driver observes an obstacle or detects an abrupt decrease in the distance to the vehicle in front because it has decelerated, and the driver therefore depresses the brake pedal, the brake switch 1 outputs a signal informing the computer unit 4 that the brake has been operated. In response to this signal, the computer unit 4 outputs a command signal to stop the operation of the throttle actuator driving circuit 14 and the gear ratio change actuator driving circuit 11 so as to minimize a driving force of the vehicle or cause the power transmission system to operate as a brake. Thus, the throttle valve 13 is closed by a maximum extent within which range the engine does not stall. As a result, no driving force is generated. If the vehicle runs at relatively high speed, the engine brake is operated. During such an operation, there is no change in function and operation of the brake, irrespective of whether the slow-run mode is maintained or not.

Such running control of a vehicle as described above enables the driver to drive on a congested road without operating the accelerator. Although it is necessary for the driver to respond to obstacles and detect an approach to the vehicle in front, the control system of the present invention eliminates the necessity of shifting from the accelerator pedal to the brake pedal, so that a time delay from the driver's recognition of need for brake operation to the driver's actual braking operation can not only be shortened, but also the accelerator pedal, the brake pedal or the clutch pedal will not be depressed incorrectly, whereby safe driving can be achieved.

Figure 5B:
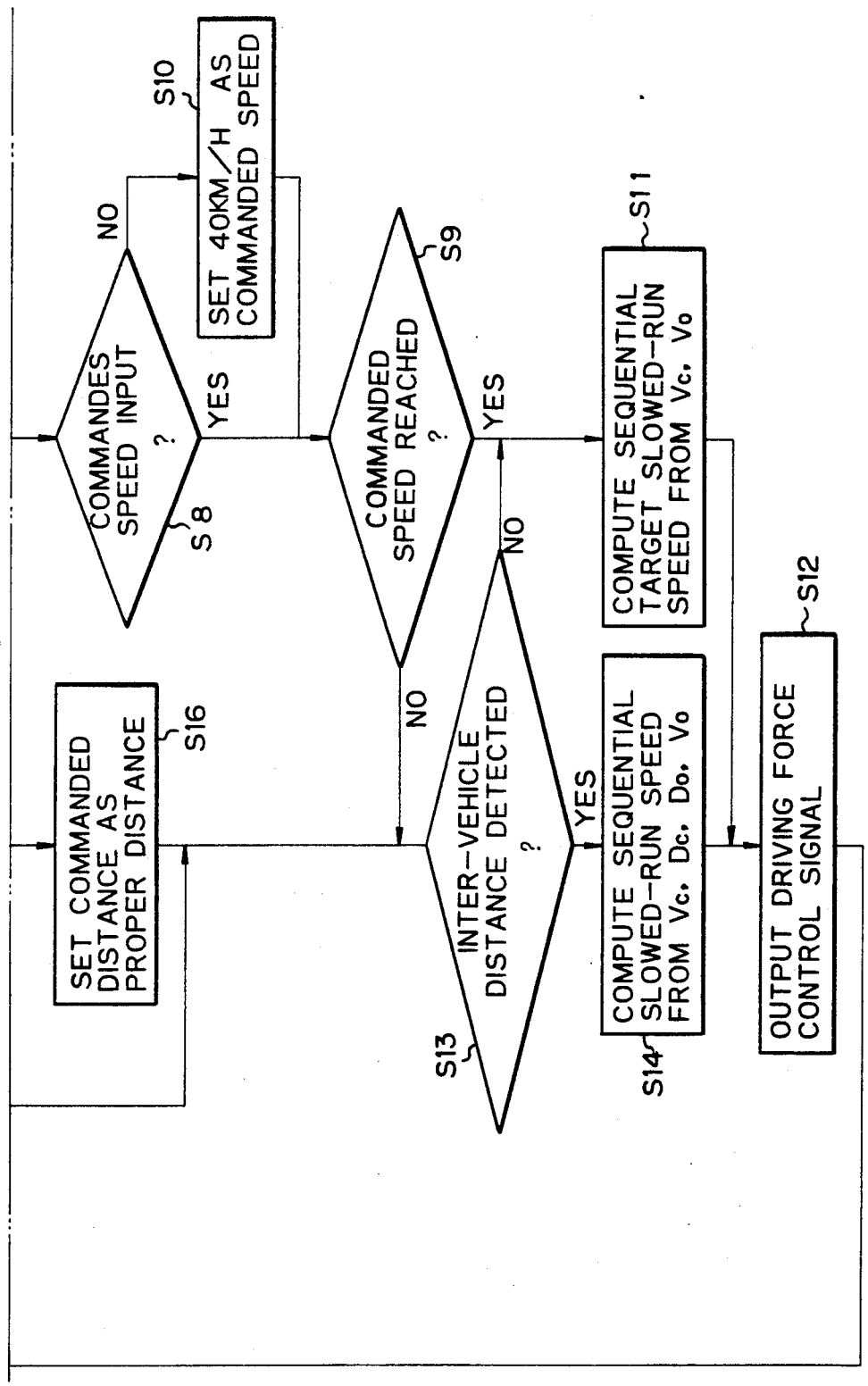

In order to perform the above-described control operation, the computer unit 4 is programmed to operate in accordance with a flowchart shown in FIGS. 5A and 5B.

At a step S1, a decision is made as to whether the slow-run mode setting switch 2 is ON or OFF. If the switch 2 is OFF, the program proceeds to a step S2 and the vehicle runs in the normal driving mode. If the switch 2 is ON, then the slow-run mode has been set (step S3), and at a step S4 a decision is made as to whether or not the brake is being operated. If yes, a generated driving force is decreased to zero (step S5), and if no, a suitable inter-vehicle distance is determined and set based on a current running speed $V_C$ (step S6). Then, the program makes a decision at a step S7 as to whether or not the selector switch 9 has selected the running speed predominating control mode, and if yes, a decision is made as to whether or not a commanded speed $V_O$ has been input (step S8). At a step S9, a decision is made as to whether or not the current speed $V_C$ has reached the commanded speed $V_O$. If no commanded speed is input at step S8, a speed of 40 km/h is set as the commanded speed $V_O$ at a step S10, and the program proceeds to step S9. If $V_C$ has reached the commanded speed $V_O$, the program sets target slow-run speed $V_T$ based on the current speed $V_C$ and the commanded speed $V_O$ (step S11), and then outputs a driving force control signal (step S12). If $V_C$ has not reached $V_O$ at step S9, i.e., the vehicle is in a transient running condition reaching the cruising, a decision is made as to whether or not an inter-vehicle distance is detected at a step S13. If no, that is, there is no vehicle in front, the program proceeds to a step S11 and the target speed $V_T$ is obtained from the current speed $V_C$ and the commanded speed $V_O$. If an inter-vehicle distance is detected, the target slow-run speed $V_T$ is set at a step S14 from the current speed $V_C$, a current inter-vehicle distance $D_C$ and a commanded inter-vehicle distance (or a proper inter-vehicle distance) $D_O$, and then the program proceeds to step S12. If the inter-vehicle distance predominating control mode is selected at step S7, a decision is made as to whether or not the commanded inter-vehicle distance $D_O$ has been input (step S15), and if no, at a step S16 the proper inter-vehicle distance determined at step S6 is set as a commanded inter-vehicle distance. Then, the program proceeds to step S13 at which, as described above, a decision is made as to whether an inter-vehicle distance is detected. If there is no vehicle in front, the running control is automatically shifted to the running speed predominating control mode, and the program proceeds to step S11. If an inter-vehicle distance is detected, the program proceeds to step S14.

A procedure of obtaining the target slow-run speed $V_T$ from the current running speed $V_C$, the commanded running speed $V_O$, the current inter-vehicle distance $D_C$ and the commanded inter-vehicle distance (or proper inter-vehicle distance) $D_O$ will now be described by way of a practical example. FIG. 6 shows an example of a change in the target slow-run speed $V_T$ from the time when a vehicle is at rest to the time when the vehicle reaches a commanded speed, for example, 65 km/h and is cruising in the running speed predominating control mode. A dot-and-dash curve shows the case in which the speed is linearly increased from zero at a time t=0 to 65 km/h at a time t=18 sec and thereafter maintained at 65 km/h. This indicates that there is no vehicle in front and that a prestored acceleration pattern is used to sequentially set a target slow-run speed. The speed $V_T$ shown by a solid curve shows the case in which there is a vehicle in front when the vehicle is accelerated. In this case, the target slow-run speed is sequentially corrected and set on the basis of the current inter-vehicle distance $D_C$ and the commanded inter-vehicle distance (or proper inter-vehicle distance) $D_O$ during the period from a time t=4 sec to a time t=14 sec, because excessive access to the vehicle ahead will be caused if the driver's vehicle runs in accordance with a prestored acceleration pattern for the running speed predominating control mode. The target slow-run speed $V_T$ is set at every predetermined time interval $\Delta t$ ($\Delta t=0.25$ sec, for example) by a procedure shown in a flowchart of FIG. 7. The flowchart of FIG. 7 shows in detail the operation at step S14 in the flowchart of FIG. 5B.

A running speed at the time of $t_i$ taken at every interval of $\Delta t$ is expressed by $V_C(i)$, a commanded running speed by $V_O(i)$, an inter-vehicle distance by $D_C(i)$ and a commanded inter-vehicle distance by $D_O(i)$, and these information values taken at the time $t_{i-1}$ (prior to the time $t_i$ by $\Delta t$) are suffixed by (i−1). Thus, $\Delta t = t_i - t_{i-1}$.

Figure 7:
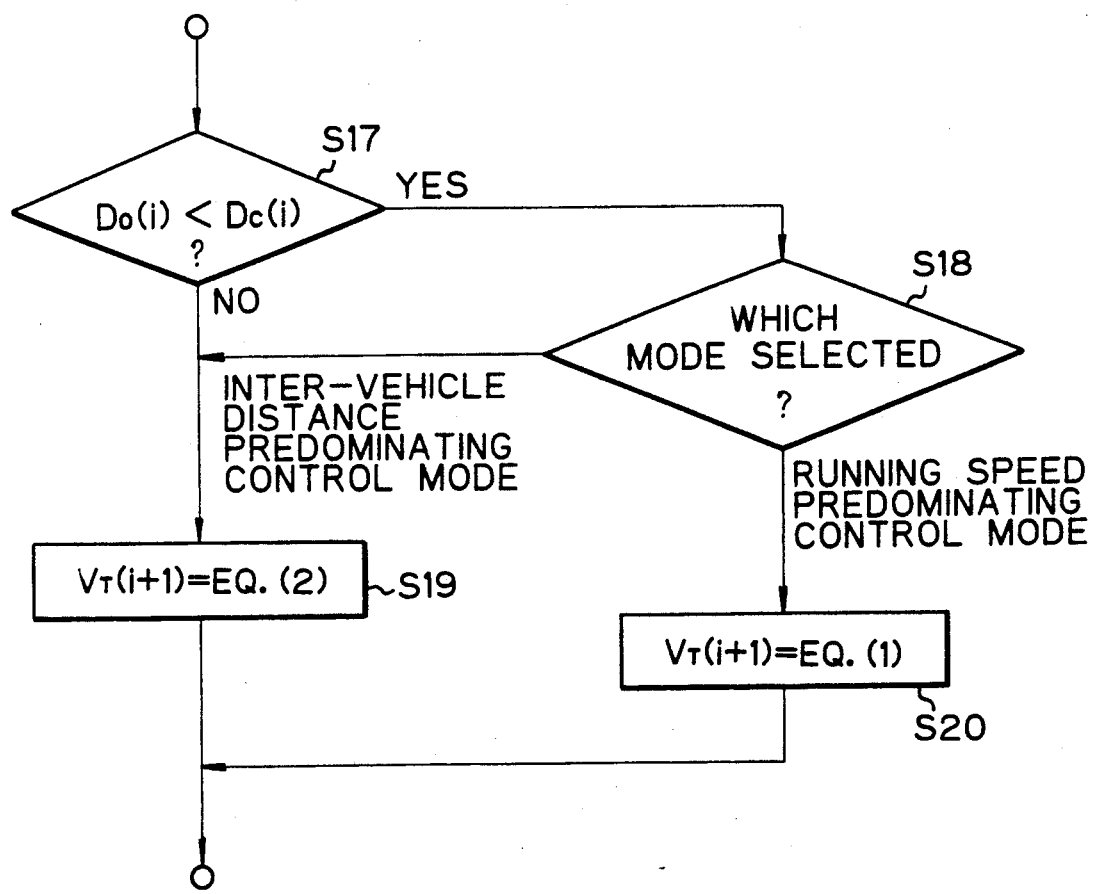
FIG. 7 is a flowchart showing in detail a part of the flowchart in FIG. 5B.

In FIG. 7, at a step S17 a decision is made as to which is larger, the inter-vehicle distance $D_C(i)$ or the commanded inter-vehicle distance $D_O(i)$. If $D_O(i) < D_C(i)$, i.e., there is a sufficient distance between the vehicle and the vehicle in front, then and at a step S18 a decision is made as to which mode has been selected by the selector switch. If $V_O(i) \geq V_C(i)$, the target slow-run speed $V_T$ is corrected in accordance with $D_O$ and $D_C$ (step S19). After checking with the selector switch, if the inter-vehicle distance predominating control mode is selected, the program proceeds to step S19, but if the running speed predominating control mode is selected, the program proceeds to a step S20 and the target slow-run speed $V_T$ is determined merely by $V_O$ and $V_C$. At each of steps S20 and S19, the target slow-run speed $V_T$ is set by the following equations:

$$V_T(i+1) = V_C(i) + a\Delta t \qquad (1)$$

$$V_T(i+1) = V_C(i) + a\Delta t - \frac{D_O(i) - D_C'(i)}{\Delta t} \qquad (2)$$

where $a$ is an acceleration preset on the basis of the commanded speed $V_O$. For example, in the case of FIG. 6 in which the vehicle is accelerated to reach a commanded speed of 65 km/h after the lapse of 18 sec, the acceleration $a$ is 1 m/sec$^2$. Equation 1 shows that the speed the vehicle attains after accelerated at the rate of $a$ during $\Delta t$ from the time of $t_i$ is set to a target speed to be attained at a time of $t_{i+1}$. Equation 2 includes equation 1 as the first and second terms and, as a third term, a term for correction by the inter-vehicle distance.

$D_C'(i)$ in equation 2 is a value of the inter-vehicle distance predicted at $t_i$ to be taken after $\Delta t$ and is calculated by the following equation:

$$D_C'(i) = 2D_C(i) - D_C(i-1) \qquad (3)$$

The speed is corrected such that a difference between the predicted value $D_C'(i)$ and the commanded inter-vehicle distance $D_O(i)$ is reduced to zero within the interval $\Delta t$ so as to attain $V_{T(i+1)}$.

Figure 8:
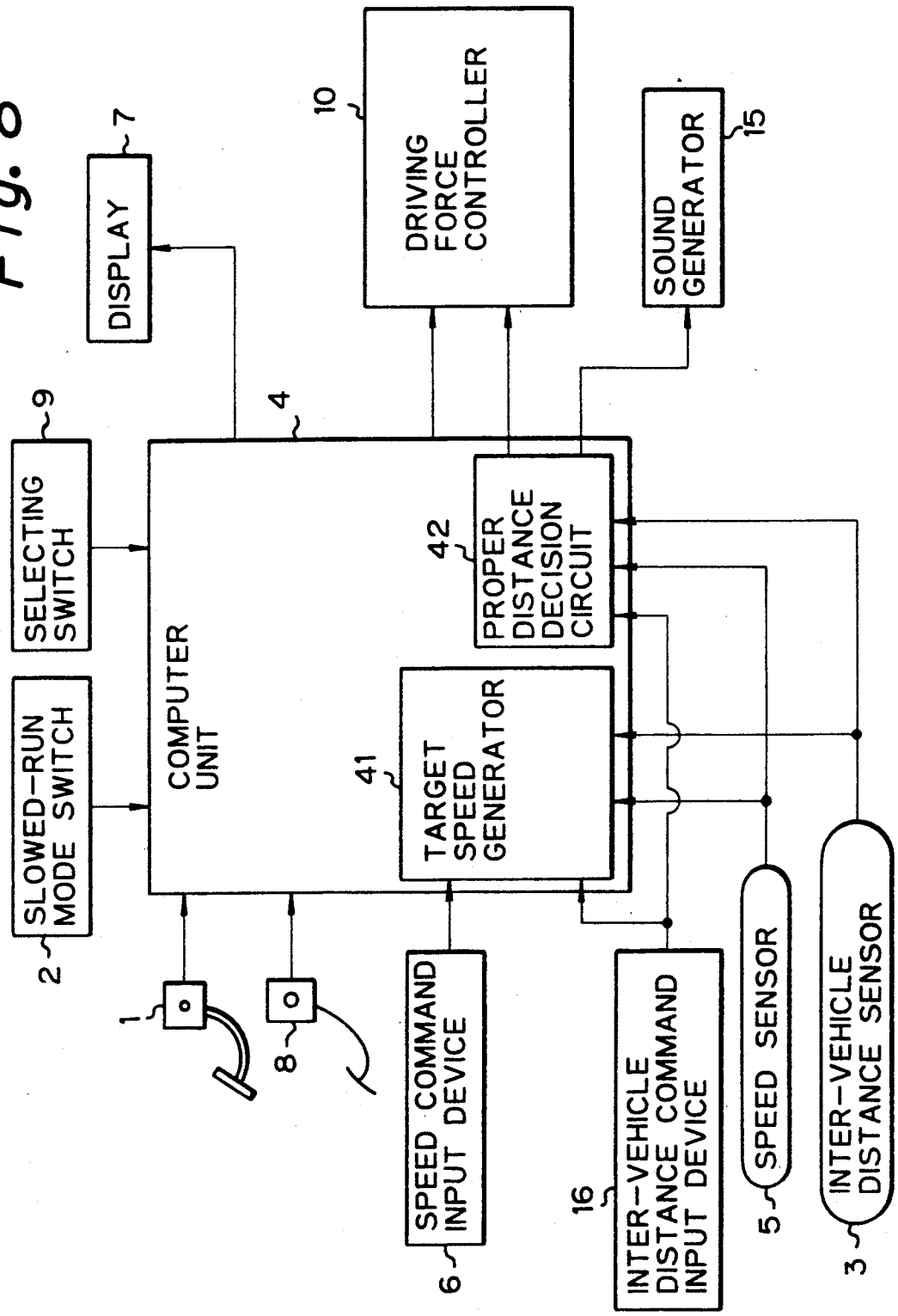
FIG. 8 is a block diagram of a system for controlling the running of a vehicle in accordance with another embodiment of the invention.

The second embodiment of a control system of the invention will now be described. FIG. 8 is a block diagram showing the construction of a control system of the second embodiment. Components similar to those shown in FIG. 2 are denoted in FIG. 8 by the same reference numerals and an explanation thereof is omitted here. A sound generator 15 generates several kinds of voices (including signal tones) prestored and held therein, in response to a signal delivered from the computer unit 4. An input device 16 is connected to the computer unit 4 for inputting an inter-vehicle distance command to a target speed generating circuit 41 of the computer unit 4 for the purpose of reflecting driver's preference to the inter-vehicle distance control when the slow-run mode is selected and the vehicle is running in the inter-vehicle distance predominating control mode. The computer unit 4 further includes a proper inter-vehicle distance deciding circuit 42. Circuit 42 receives signals output from the vehicle speed sensor 5 and the inter-vehicle distance sensor 3 and data from the inter-vehicle distance command input device 16, and delivers a signal to the sound generator 15 for warning that the vehicle has come close to the vehicle in front and providing a braking signal to the driving force control device 10.

The operation of the second embodiment is generally the same as that of the first embodiment, and some different operations will be described below. In the inter-vehicle distance predominating control mode or the running speed predominating control mode, when the vehicle in the slow-run mode comes close to the vehicle in front for some reason, the proper inter-vehicle distance deciding circuit 42 makes a decision as to whether or not a current inter-vehicle distance is within the proper range. More specifically, an approach speed Vap (corresponding to a difference (Vc−Va) and representing the rate of change in the inter-vehicle distance) is computed from sequentially input inter-vehicle distance information and running speed information. The product of that computation and a first preset value $T_1$ is compared with current inter-vehicle distance information $D_C$. And, if $(Vap \times T_1) > D_C$, then an approach signal is output. The sound generator 15 receives this approach signal and emits an alarm signal tone or voice to inform the driver of an excessive approach to the vehicle in front. It is desirable that the alarm produced becomes higher as the difference between $(Vap \times T_1)$ and $D_C$ is larger. When such a situation continues and the product of Vap and a second preset value $T_2$ becomes larger than $D_C$, then the braking commanding signal is output. $T_1$ and $T_2$ are determined in consideration of various time delays such as the time required for the driver to decide if the brake should be applied when he notices the vehicle in front, the time required for the driver to manipulate the brake and the time required for the brake to initiate an actual braking operation. Preferably, $T_1$ may be normally set to 2 to 5 seconds and $T_2$ to 1,5 to 2 seconds. The driving force control device 10, upon receipt of such a braking command signal, forces the brake to operate just as the brake pedal is operated by the driver although the vehicle is in the slow-run mode, and the driving force is controlled such that the braking force is applied to the vehicle. Thus, the throttle valve 12 is completely closed to generate no driving force, and the transmission 22 is set to such a gear ratio that the engine rotation speed does not excessively rise thus braking the vehicle.

A flowchart describing an operation of the second embodiment is identical to that of FIGS. 5A and 5B except that, after step S3 or before step S6 in the flowchart of FIG. 5, a step of detecting the above-described approach speed is provided. If the approach speed satisfies the above-described conditions, the approach signal calling the driver's attention and the braking command signal are output, and if not satisfied, the program proceeds to the subsequent steps, similar to the case described above in reference to FIGS. 5A and 5B.

Although the above-described embodiments are arranged so that, during a transient running operation reaching the cruising, a target slow-run speed is sequentially set in consideration of an inter-vehicle distance even in the running speed predominating control mode, the target slow-run speed may be set without considering an inter-vehicle distance during the transient running operation.

What is claimed is:

1. A system for controlling a driving vehicle operated by a driver, the driving vehicle comprising a brake, and an accelerator, the system comprising:
   means for setting a slow-run mode;
   means for detecting that the brake of the driving vehicle is being activated;
   means, mechanically separated from the accelerator of the driving vehicle, for controlling a driving force of the driving vehicle;
   means for detecting a running speed of the driving vehicle;
   means for setting a slow-run speed command signal set by the driver representing a commanded speed;
   means for receiving information concerning the brake activation, the running speed, and the slow-run speed command signal, and for sequentially generating a target slow-run speed command signal in accordance with the received information so that a target slow-run speed can be sequentially increased incrementally over time, wherein, in the slow-run mode, when the brake is not activated, said means for controlling said driving force is driven so as to allow the running speed of the driving vehicle to increase to become the target slow-run speed in response to the target slow-run speed command signal, and, when the brake is activated, no driving force is produced;
   means for measuring an inter-vehicle distance between the driving vehicle and a preceding vehicle in front of the driving vehicle, said means for generating a target slow-run speed command signal being operative, in response to received information concerning the brake activation, the inter-vehicle distance, the running speed of the vehicle, and a slow-run speed command signal, to sequentially generate a target slow-run speed command signal that causes the driving vehicle to incrementally accelerate in accordance with the received information; and means for setting a commanded inter-vehicle distance;

wherein the system operates operating in one of two control modes selected by a means for selecting wherein, a first control mode is an inter-vehicle distance predominating control mode, and the driving vehicle is incrementally accelerated until the commanded inter-vehicle distance is measured by said means for measuring, and a second control mode is a running speed predominating control mode, and the driving vehicle is incrementally accelerated until the commanded speed is detected as the running speed.

2. A system for controlling a driving vehicle operated by a driver, the driving vehicle comprising a brake, and an accelerator, the system comprising:

means for setting a slow-run mode;

means for detecting that the brake of the driving vehicle is being activated;

means, mechanically separated from the accelerator of the driving vehicle, for controlling a driving force of the driving vehicle;

means for sensing a running speed of the driving vehicle;

means for measuring a distance between the driving vehicle and a preceding vehicle in front of the driving vehicle;

means for setting a slow-run speed command signal representing a commanded speed;

means, in response to information concerning the brake activation, the measured inter-vehicle distance, the running speed of the vehicle, and the slow-run speed command signal, for sequentially generating a target slow-run speed command signal in accordance with the received information so that a target slow-run speed can be sequentially increased incrementally over time; and decision means, in response to information concerning the inter-vehicle distance and the running speed of the vehicle, for calculating a speed approaching the vehicle in front, to make a decision as to whether the measured inter-vehicle distance is with a proper distance value so as to output a warning signal to the driver and output a braking command signal to said driving force control means when the inter-vehicle distance between the preceding car and the driving car is less than the proper distance value, wherein in the slow-run mode, if the braking command signal is output from said decision means, said driving force control means is driven in accordance with the braking command signal, and wherein, if there is no such command signal, when the brake is not activated, said driving force control means is driven to cause the vehicle to run at the target slow-run speed, and when the brake is activated, said driving force control means is driven such that no driving force is produced;

wherein the system operates in one of two control modes selected by a means for selecting wherein, a first control mode is an inter-vehicle distance predominating control mode, the driving vehicle being incrementally accelerated until the commanded inter-vehicle distance is measured by said means for measuring, and a second control mode is a running speed predominating control mode, the driving vehicle being incrementally accelerated until the commanded speed is detected as the running speed.

3. The system as set forth in claim 2, wherein said decision means outputs a warning signal when the product of a speed in approaching the vehicle in front and a first set value is larger than a current inter-vehicle distance and outputs a braking command signal when the product of a speed in approaching the vehicle in front and a second set value is larger than a current inter-vehicle distance.

* * * * *